United States Patent
Badharudeen et al.

(10) Patent No.: US 8,494,274 B2
(45) Date of Patent: Jul. 23, 2013

(54) SYSTEM AND METHOD FOR PERFORMING A SHOPPING ACTIVITY THROUGH A WIRELESS COMPUTING DEVICE

(75) Inventors: Shafeer Badharudeen, Thiruvananthapuram Kerala (IN); Sameer Mohamed Khan, Trivandrum Kerala (IN); Navin Narayan, Trivandrum Kerala (IN); Manu Gokuladasan Nair, Thiruvananthapuram Kerala (IN)

(73) Assignee: Infosys Limited (IN)

( * ) Notice: Subject to any disclaimer, the term of this patent is extended or adjusted under 35 U.S.C. 154(b) by 420 days.

(21) Appl. No.: 12/855,270

(22) Filed: Aug. 12, 2010

(65) Prior Publication Data
US 2011/0311164 A1 Dec. 22, 2011

(30) Foreign Application Priority Data
Jun. 18, 2010 (IN) .............. 1697/CHE/2010

(51) Int. Cl.
*G06K 9/18* (2006.01)
*G06K 9/00* (2006.01)
*G06Q 20/00* (2006.01)
*G06Q 30/00* (2006.01)

(52) U.S. Cl.
USPC .............. 382/183; 382/141; 705/16; 705/23; 705/26.8; 705/26.81; 705/27.1; 705/27.2

(58) Field of Classification Search
USPC ................. 382/141, 183; 705/26.1–27.2, 16, 705/23
See application file for complete search history.

(56) References Cited

U.S. PATENT DOCUMENTS

| | | | |
|---|---|---|---|
| 7,668,754 B1 * | 2/2010 | Bridgelall | 705/26.9 |
| 8,380,577 B2 * | 2/2013 | Chen et al. | 705/26.1 |
| 2005/0149392 A1 * | 7/2005 | Gold et al. | 705/14 |
| 2005/0230472 A1 * | 10/2005 | Chang | 235/383 |
| 2009/0285483 A1 * | 11/2009 | Guven et al. | 382/181 |
| 2011/0098056 A1 * | 4/2011 | Rhoads et al. | 455/456.1 |
| 2011/0191184 A1 * | 8/2011 | Blackhurst et al. | 705/14.57 |

* cited by examiner

*Primary Examiner* — Anand Bhatnagar
*Assistant Examiner* — Soo Park
(74) *Attorney, Agent, or Firm* — Cantor Colburn LLP

(57) ABSTRACT

The invention provides a method, system and computer program product for performing a shopping activity in a shopping store through a wireless computing device of a customer. The wireless computing device is equipped with an imaging device. The customer uses his/her wireless computing device to select a product to be purchased from the shopping store and subsequently completes the purchase through the wireless computing device.

29 Claims, 6 Drawing Sheets

SYSTEM AND METHOD FOR PERFORMING A SHOPPING ACTIVITY THROUGH A WIRELESS COMPUTING DEVICE

FIELD OF THE INVENTION

The present invention relates to purchase through a wireless computing device. More specifically, it relates to performing a shopping activity through a wireless computing device in a shopping store.

BACKGROUND

Retail outlets/shopping stores today face an exponential increase in the number of customers that visit everyday to buy products. To comply with the increased number of customers, the primary task of a retail outlet is to implement an effective point-of-sale (POS) solution. Presently, the retail outlet uses a bar code scanner-enabled POS system. In the current system, an attendee scans the product selected by the customer and subsequently completes the purchase for the selected products for the customer. This procedure consumes time as the attendee has to manually scan each product selected by the customer and correspondingly prepare an invoice for the customer. As a result, other customers have to wait in a queue to purchase the products.

To enrich the customers' shopping experience, typically, retail outlets presently increase the number of POS systems. However, it proportionally increases the cost incurred by the retail outlet. This proportional increase in the cost is attributed to installing POS systems, maintaining them and salaries for attendees.

Alternately, few retail outlets also provide self check-out POS systems, which are fixed at pre-defined locations, to the customers to select products and complete the purchase. However, this requires a retail outlet to invest significantly in buying multiple self check-out POS systems. Furthermore, the retail outlet would also incur huge maintenance cost for the self check-out POS systems. Moreover, the customer would still have to wait in a queue for their turn to complete the purchase at the corresponding self check-out POS station.

The other solution that is presently used to enrich customer shopping experience is to implement an online shopping store. A customer is provided with an online shopping store platform in his/her computing device. The online shopping store platform enables the customer to browse through one or more products available in the online shopping store and subsequently purchase one or more available products. In this kind of online shopping store, the customer is dependent on the online shopping store for review or the attribute of the products as the customer does not have any physical experience of the products. Moreover, the customer has to still wait for the product to be delivered to him/her.

The above mentioned limitations of the existing retail stores and the online shopping stores give rise to the need for a method, a system, and a computer program product that minimizes the time taken by a customer to complete the purchase of a selected product, while enriching customer's shopping experience in the retail outlet.

SUMMARY

The invention provides a method, system and computer program product for performing a shopping activity in a retail outlet/shopping store, hereinafter referred to as "shopping store", through a wireless computing device. The wireless computing device used by a customer is equipped with an imaging device. The method involves receiving an image of an identification tag of a product selected by the customer, wherein the image is captured by the imaging device of the wireless computing device. Subsequently, a product detail of the selected product is retrieved from a database on the basis of the identification tag. Thereafter, the customer purchases the product through the wireless computing device on the basis of the retrieved product detail.

The method, system and computer program product described above have a number of advantages. The invention as described above provides a cost efficient and a scalable medium to perform a shopping activity in a shopping store. The invention enables a customer to select a product available in the shopping store using his/her wireless computing device and subsequently purchase the selected product using the wireless computing device. This in turn helps the customer save considerable time required to purchase the product in the shopping store as compared with the existing point-of-sale systems (POS). Additionally, the customer is provided with at least some product detail of the selected product and any other similar product information to further enrich the customer's shopping experience in the shopping store. Moreover, the invention removes any additional maintenance cost applied to the POS system as the entire shopping activity is carried from the customer's wireless computing device. Subsequently, it also reduces the cost applied to operate and maintain one or more POS systems. The invention further provides an avenue for retailers to display targeted promotional/advertisement messages on the customer's wireless computing device. In addition to the above mentioned advantages, the system provides a platform for the customer to interact with other customers present in the shopping store, the customer and the other customers being registered with the shopping store, and furthermore locate them in the shopping store.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE DRAWINGS

The invention provides a method, system and computer program product for performing a shopping activity in a shopping store through a wireless computing device of a customer. The wireless computing device is equipped with an imaging device. The customer uses his/her wireless computing device to select a product to be purchased from the shopping store and subsequently complete the purchase through the wireless computing device.

Figure 1:
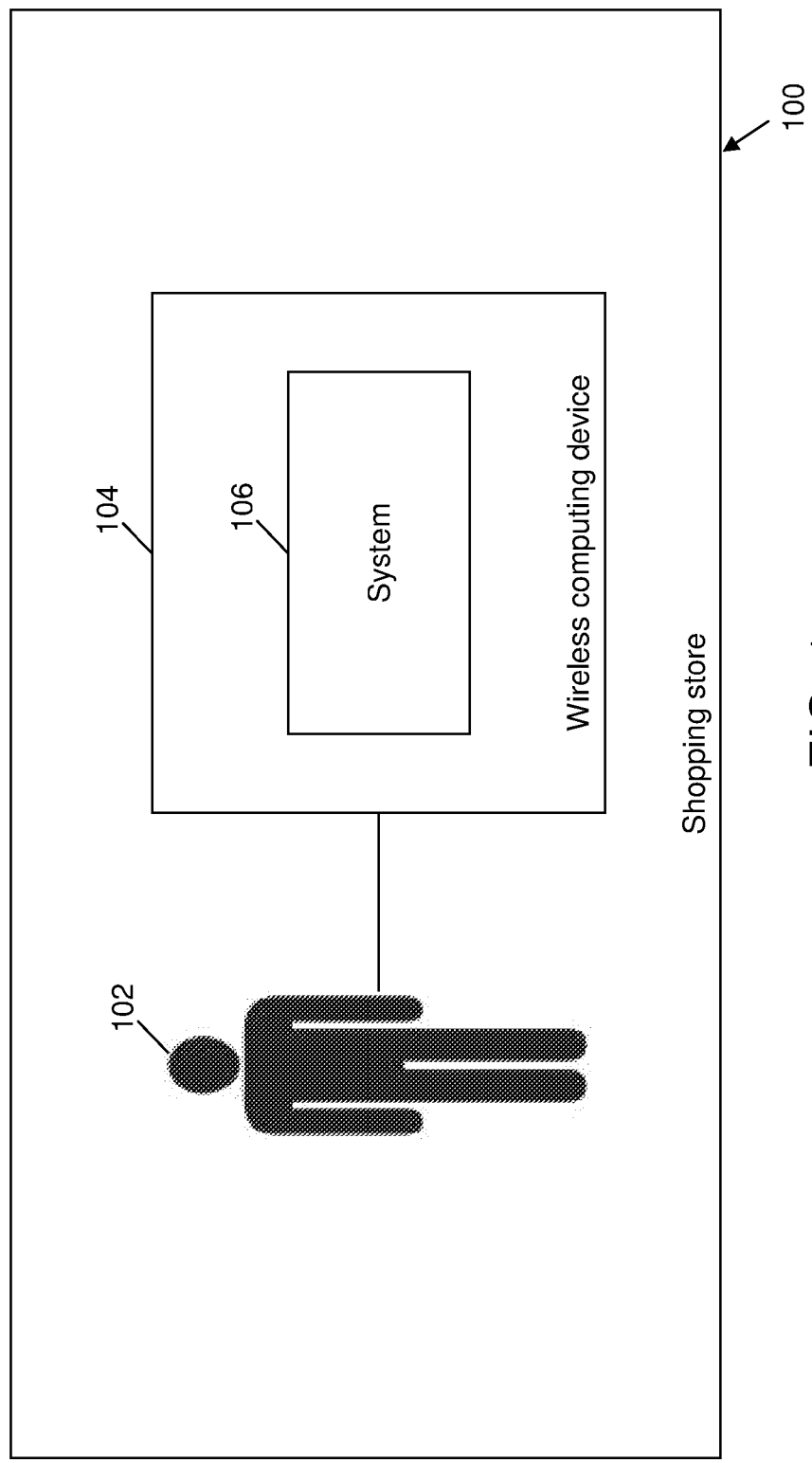
FIG. 1 illustrates an environment in which various embodiments of the invention may be practiced.

FIG. 1 illustrates a shopping store 100 in which a customer 102 carries a wireless computing device 104 to perform a shopping activity. Further, wireless computing device 104 includes a system 106.

In an embodiment of the invention, the shopping activity may be defined as customer 102 purchasing one or more products in shopping store 100. A customer, such as customer 102, may move around in shopping store 100 and select a product placed in shopping store 100 to purchase it. The customer subsequently captures an image of the identification tag such as a barcode, a picture tag, and the like attached to the selected product with the help of the imaging device enabled in wireless computing device 104.

Thereafter, system 106 receives the image of the identification tag (barcode) and subsequently processes the barcode to retrieve details of the selected product from a database. In an embodiment of the invention, wireless computing device 104 is enabled with data communication capability to interact with the database. Further, it may be apparent to any person skilled in the art that the retrieved product details may be displayed to the customer on wireless computing device 104. Various examples of the product details include, but are not limited to, the price of the product, manufacturer of the product, and consumer ratings of the product.

Thereafter, the customer may complete the purchase of the selected product in response to the retrieved product details through wireless computing device 104 with the help of system 106. It would be appreciated by a person skilled in the art that the customer can shop for any number of products and subsequently complete the purchase either by selecting each product or by selecting all the products he/she intends to purchase. The purchase of the selected product through system 106 is further explained in detail in conjunction with FIG. 2 and FIG. 3.

In various embodiments of the invention, wireless computing device 104 can be a mobile phone, a Personal Digital Assistant (PDA), a tablet, and the like. Further, various data communication paths that may be utilized by wireless computing device 104 for interacting with the database and facilitating the purchase may include, but are not limited to, General Packet Radio Service (GPRS), Enhanced Data Rates for GSM Evolution (EDGE), Wireless Fidelity (Wi-Fi™), Worldwide Interoperability for Microwave Access (WiMAX), and Wireless Local Area Network (WLAN). Further, the database including the product details may be implemented in form of a server that may be located locally or remotely to shopping store 100.

To further elaborate the working of system 106 with the help of an example, a customer selects a product such as a watch placed in a shopping store such as shopping store 100. To purchase the selected watch, the customer captures an image of the identification tag, such as a barcode, attached to the watch using an imaging device enabled in wireless computing device 104. It may be apparent to any person skilled in the art that the imaging device may be a camera equipped in a mobile phone. The captured image of the barcode is further processed by system 106. Thereafter, system 106 retrieves the product detail of the selected watch from a database. Subsequently, the retrieved product detail is displayed on the customer's mobile phone, such as wireless computing device 104. In case the customer wants to purchase the product (watch) in response to the displayed product detail, system 106 provides a platform to finalize the purchase through wireless computing device 104. On successful completion of the purchase, system 106 generates a receipt of the purchase indicating successful transaction. Hence, the customer can purchase the selected product through his/her mobile phone without any manual intervention from the attendee of the shopping store.

Figure 2:
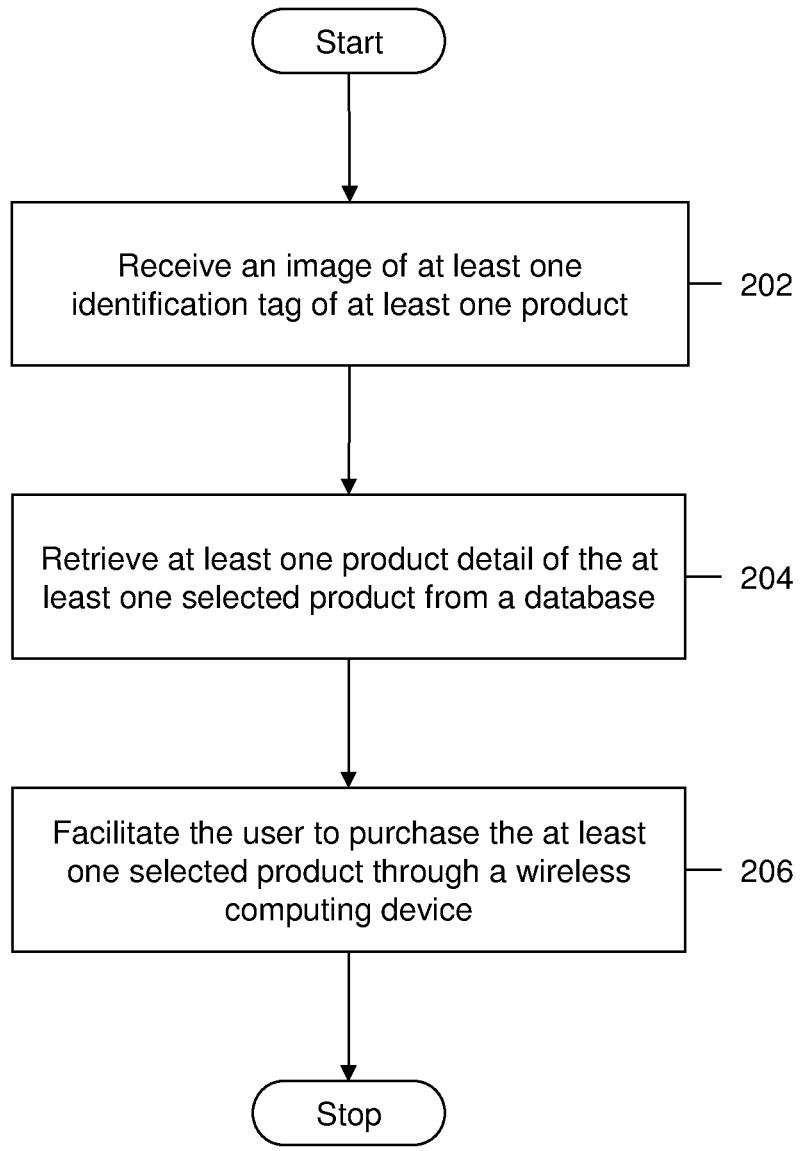
FIG. 2 is a flowchart illustrating a method for performing a shopping activity in a shopping store through a wireless computing device, in accordance with an embodiment of the invention.

FIG. 2 is a flowchart illustrating a method for performing a shopping activity in a shopping store, such as shopping store 100, through a wireless computing device, such as wireless computing device 104.

The method for performing the shopping activity in the shopping store is implemented with the help of the wireless computing device and a system, such as system 106. As explained earlier, a customer, such as customer 102, may select any product that he/she wishes to purchase and capture an image of an identification tag associated with the selected product, such as a watch. In various embodiments of the invention, the image is captured by an imaging device, such as a camera, which is in-built in the wireless computing device. In an embodiment of the invention, the wireless computing device is a mobile phone of the customer.

Thereafter, at 202, the image of an identification tag of the product is received. In an embodiment of the invention, the identification tag may be a one dimensional (1-D) barcode, a two dimensional (2-D) barcode, an image tag, and the like. It will be apparent to a person skilled in the art that a barcode is typically attached to products available in the shopping store to maintain the corresponding product details of the product in a database.

Subsequently, at 204, at least one product detail is retrieved from the database corresponding to the received identification tag of the at least one selected product. Various examples of the product details include, but are not limited to, the price of the product, manufacturer of the product, and consumer ratings of the product. In continuation to the above example, details associated with the selected watch are retrieved. The product details may include, but are not limited to, the price, model number, and the manufacturer of the watch. The details associated with the methodology for retrieving the product detail corresponding to the scanned identification tag are explained in FIG. 3.

At 206, the customer is facilitated to purchase the selected product through the wireless computing device. In response to the retrieved product detail, the customer is provided with an interface to purchase the selected product. In an embodiment of the invention, the interface can be a pay form, in which the customer fills in one or more required payment details to complete the transaction. The one or more required payment details can be credit card information, a customer authentication details in response to a payment gateway, and the like. It may be apparent to any person skilled in the art that the wireless computing device will interact with a payment gateway server to facilitate the purchase. In another embodiment of the invention, the interface may interact with an in-built pre-paid tag, for example, Near Field Communication (NFC) tag. An NFC device constitutes a stored available amount that can be directly utilized to purchase the selected product. This has been further explained in detail in conjunction with FIG. 3 and FIG. 5.

Figure 3A:
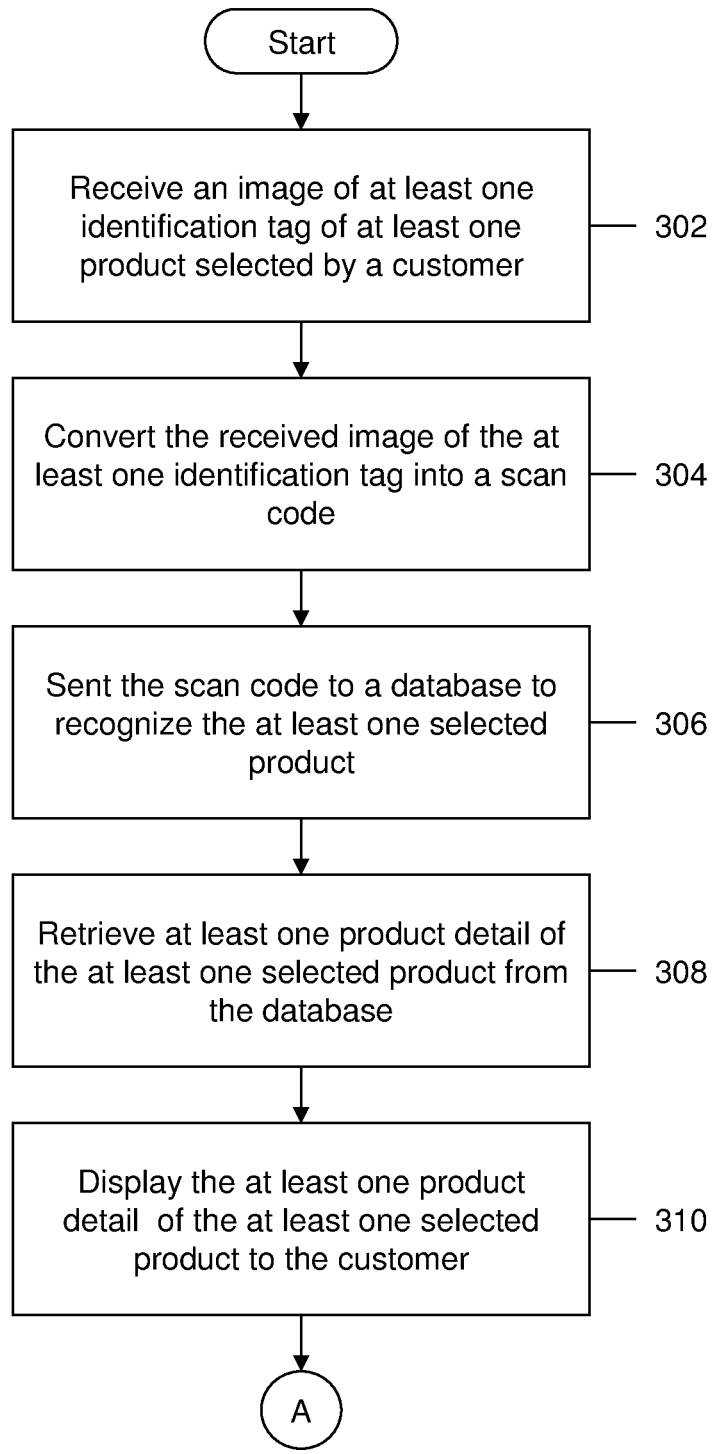
FIG. 3A and FIG. 3B represent a flowchart illustrating a method for performing a shopping activity in a shopping store through a wireless computing device, in accordance with another embodiment of the invention.
Figure 3B:
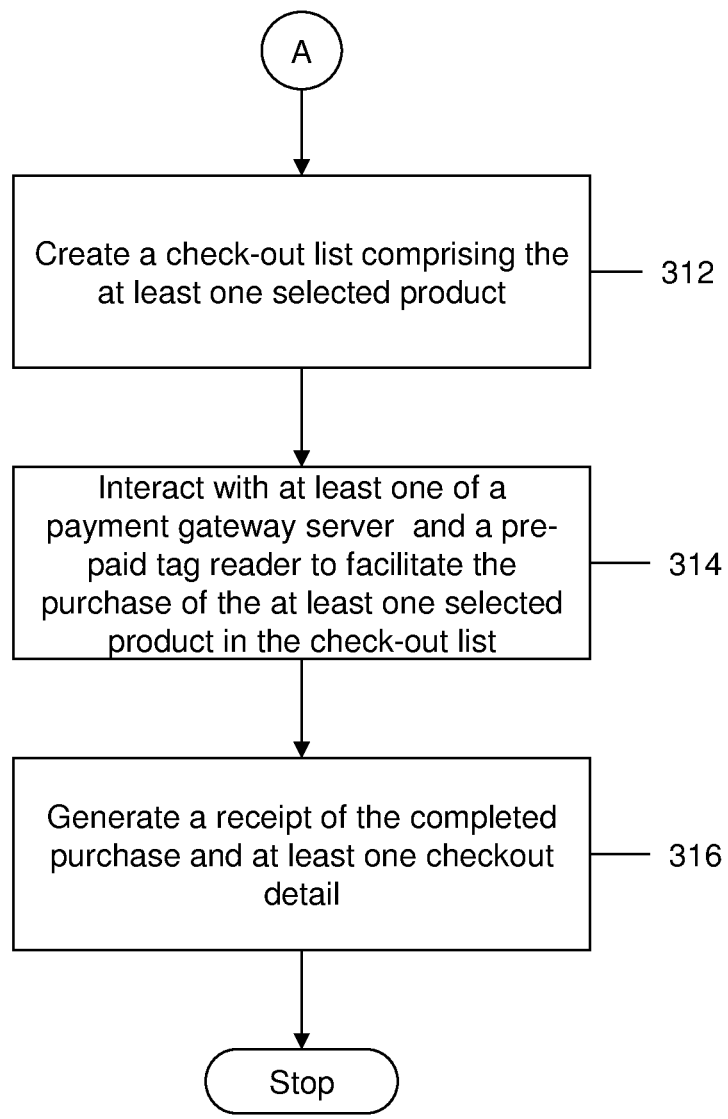

FIG. 3A and FIG. 3B represent a flowchart illustrating a method for performing a shopping activity in a shopping store, such as shopping store 100, through a wireless computing device, such as wireless computing device 104, in accordance with another embodiment of the invention. As explained earlier, the customer may select the product, such as a watch, placed in the shopping store and capture an image of the identification tag attached to the product using a camera in-built in the wireless computing device (mobile phone). In an embodiment of the invention, the identification tag may be a barcode.

At 302, the image of the barcode of the product selected by the customer is received by the wireless computing device. Subsequently at 304, the captured image of the barcode is converted into a scan code. In an embodiment of the invention, the captured image of the barcode is converted into the scan code by using one or more image processing algorithms. It may be apparent to any person skilled in the art that various image processing algorithms are available to convert captured image of a barcode into a scan code; where the scan code indicates the encrypted detail embossed on the barcode. Moreover, the conversion depends on the symbology of the barcode (identification tag) associated with the selected product. Following the example of the watch, the captured image of the barcode is processed to derive a scan code of it.

Thereafter, at 306, the scan code derived from the received image of the barcode is sent to a database of the shopping store by the wireless computing device for recognizing the product. In an embodiment of the invention, the converted scan code is sent through a data communication channel initiated by the wireless computing device. The converted scan code is then utilized to check for the product detail of the product selected by the customer in the database. It may be apparent to a person skilled in the art that the database includes product details of all the products sold in the shopping store. In other words, the database maintains the inventory of the shopping store. On receiving the scan code of the selected product, the database checks for the related product and identifies the product detail of the selected product. Further, the product detail(s) corresponding to the selected product is sent from the database to the wireless communication device at 308 over the data communication channel. In other words, the product details are retrieved from the database corresponding to the selected product. Various examples of the data communication channel include, but are not limited to, General Packet Radio Service (GPRS), Enhanced Data Rates for GSM Evolution (EDGE), Wireless Fidelity (Wi-Fi™), Worldwide Interoperability for Microwave Access (WiMAX), and Wireless Local Area Network (WLAN).

The retrieved product detail is then displayed on the wireless computing device of the customer at 310. For example, model number of the watch, brand, and price. In an embodiment of the invention, the customer is also provided with information about the products related to the selected product and any other related promotion/advertisement corresponding to the selected product. Thereafter, the customer may decide to purchase the product. At 312, subsequently a check list including at least one selected product to be purchased is created. It will be apparent to any person skilled in the art that the check list primarily contains the product details, such as specification of the selected product and the price corresponding to the selected product and the like. Following the above example, after finalizing the watch to be purchased by the customer a check list is prepared, in which the price and the product detail such as name, model, and price are listed. It may be apparent to any person skilled in the art that if the customer selects more than one product to be purchased, the check list correspondingly will contain the product details associated with each of the selected product. Further, in such case, the check list will also provide the total sum of the individual prices of the selected products. It is well known in the art that the customer may then confirm the total payment to be paid for the selected product(s) through the Graphical User Interface (GUI) of the wireless computing device.

Subsequently, the wireless computing device at 314 allows the customer to pay for the selected products. In an embodiment of the invention, the wireless computing device communicates/interacts with a payment gateway server to complete the transaction for the total amount displayed in the check list. Thereafter, the purchase of the selected product is completed based on successful transaction conducted through the wireless computing device. For example, the customer is enabled to pay through a credit card payment gateway server by his/her wireless computing device.

In another embodiment of the invention, the wireless computing device is equipped with a pre-paid tag device such as a Near Field Communication (NFC) device. The NFC device enables the wireless computing device to communicate with a short-range NFC reader placed at different locations in the shopping store. The NFC device installed in the wireless computing device is pre-charged (re-filled) in advance with a defined amount by the customer through a service provider. Hence, after the check list is created, the customer places its NFC-enabled wireless computing device near the NFC reader, which in turn automatically deducts the total amount from the pre-stored amount.

After the payment for the purchase has been made by the customer, a receipt of the completed purchase containing at least one check list detail is generated at 316. In an embodiment of the invention, the at least one check list detail is at least one of a total weight of the purchased product and the identification data of the purchased product. Further, the generated receipt is displayed on the customer's wireless communication device. In another embodiment of the invention, the generated receipt can also be printed from any printer placed in the shopping store.

In an embodiment of the invention, the total weight of the selected products is printed on the receipt so that an attendee at the shopping store can cross check printed total weight of the purchased products with the actual total weight, based on the stored data of the purchased products. It may be apparent to any person skilled in the art that such verification will strengthen the security mechanism at the shopping store and the customer thus will be able to take only those products out of the shopping store for which he has paid the amount successfully.

In another embodiment of the invention, the identification tag, i.e., the barcode, on the purchased product can be disabled based on the identification data. The identification data thus generated by the wireless computing device can be utilized by the server of the shopping store to disable the corresponding identification tags; thereby allowing the customer to safely walk out of the shopping store with the purchased products. In various embodiment of the invention, the identification data may be a unique combination of one or more alphabets, characters, and alphanumeric characters. It may be apparent to a person skilled in the art that the server may be installed and operated by the shopping store.

In an embodiment of the invention, the methodology to perform the shopping activity in the shopping store enables the customer to create a user profile in the database of the shopping store. The customer can thus login to the database using its authentication details to further perform various other activities in the database of the shopping store. For example, post login into the database of the shopping store, the customer can browse through all the products available in the shopping store. The customer is also enabled to create a wish list prior to visiting the shopping store. The wish list contains selected one or more products which the customer want to purchase from the shopping store. Subsequently, when the customer visits the shopping store, he/she can view the saved wish list and further cross-check the product to be purchased from the shopping store. For example, in case the customer has saved a product such as a watch in his wish list, then while shopping in the shopping store the customer can view his saved wish list and cross-check the product (watch) he needs to purchase.

The customer is also enabled to add his/her one or more friends in the user profile. In an embodiment of the invention, the friends are also registered with the shopping store. The customer is furthermore enabled to interact with his added friends in case they are also simultaneously present in the shopping store. Moreover, the location of the customer and his/her friends can also be shared among the customer and his/her friends. The methodology of user profile, wish list, interaction with friends, and locating a friend are further elaborated in detail in conjunction with FIG. 5.

Figure 4:
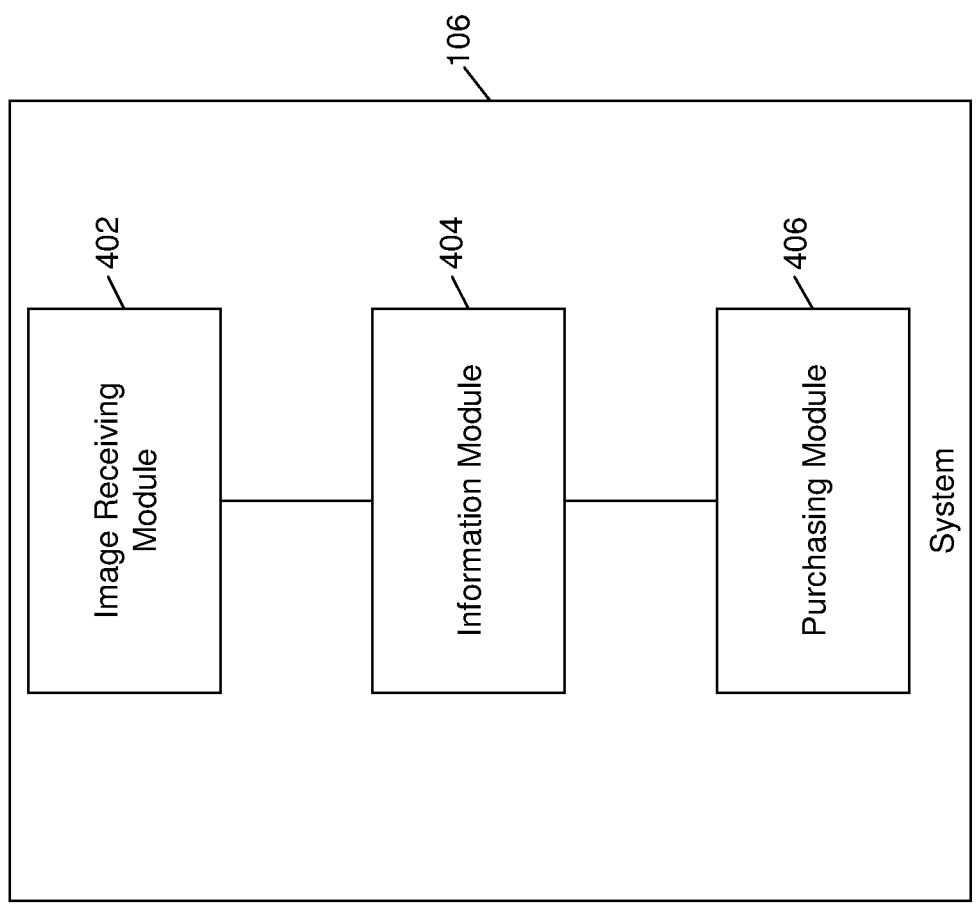
FIG. 4 is a block diagram of a system for performing a shopping activity in a shopping store through a wireless computing device, in accordance with an embodiment of the invention.

FIG. 4 is a block diagram of system 106 for performing a shopping activity in shopping store 100 through wireless computing device 104, in accordance with an embodiment of the invention. System 106 includes an image receiving module 402, an information module 404, and a purchasing module 406. As described earlier system 106 is a part of wireless computing device 104 of customer 102.

As explained earlier, a customer, such as customer 102 may select any product that he/she wishes to purchase and may capture an image of the identification tag associated with the selected product, such as a watch. In various embodiments of the invention, the image is captured by an imaging device, such as a camera, in-built in wireless computing device 104. In an embodiment of the invention, wireless computing device 104 is a mobile phone of the customer.

Image receiving module 402 receives the captured image of the identification tag of a selected product. For example, the customer may select a laptop for purchasing from a shopping store, such as shopping store 100. Subsequently, the customer captures an image of the identification tag, such as barcode, attached to the laptop by the camera of his wireless computing device 104, which is then received by image receiving module 402.

Thereafter, information module 404 retrieves at least one product detail corresponding to the captured image of the selected product. In an embodiment of the invention, the at least one product detail is retrieved from a database of the shopping store. The at least one product detail could be the model number, price, and brand/manufacture associated with the laptop. The methodology of retrieving the product detail(s) of the selected product based on the associated identification tag is explained in conjunction with FIG. 3 and FIG. 5.

After which, purchasing module 406 allows the customer to purchase the selected product in response to the retrieved product detail. In an embodiment of the invention, once the customer has decided to buy the selected product, purchasing module 406 facilitates the customer to purchase the selected product by completing the financial transaction.

In an embodiment of the invention, purchasing module 406 facilitates the customer to complete the purchase by verifying customer's payment details such as credit card details and payment authentication details. It may be apparent to any person skilled in the art that purchasing module 406 may interact with the credit card gateway server to complete the transaction.

Figure 5:
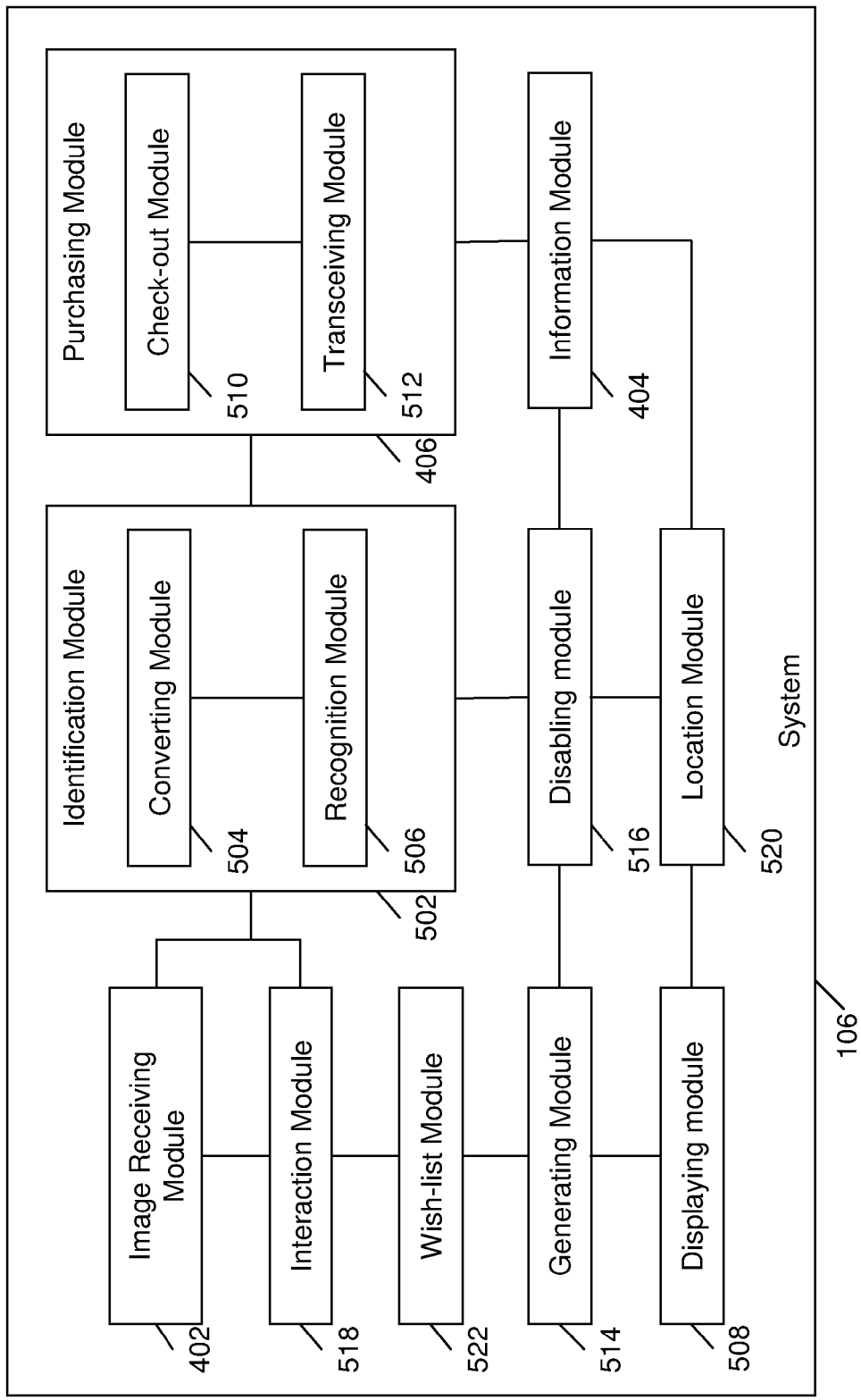
FIG. 5 is a block diagram of a system for performing a shopping activity in a shopping store through a wireless computing device, in accordance with another embodiment of the invention.

In another embodiment of the invention purchasing module 406 completes the transaction with the help of a pre-paid tag, such as Near Field Communication (NFC) tag, embedded in wireless computing device 104 as explained in detail in conjunction with FIG. 3 and FIG. 5.

FIG. 5 is a block diagram of system 106 for performing a shopping activity in shopping store 100 through a wireless computing device, such as wireless computing device 104, in accordance with another embodiment of the invention. System 106, in addition to image receiving module 402, information module 404, and purchasing module 406, further includes an identification module 502, a displaying module 508, a generating module 514, a disabling module 516, an interaction module 518, a location module 520, and a wish-list module 522.

As already described in FIG. 4, image receiving module 402 receives an image of the identification tag of the selected product. Furthermore, identification module 502 processes the received image of the identification tag in order to identify the corresponding product from a database of a shopping store, such as shopping store 100. Identification module 502 includes a converting module 504 and a recognition module 506. In an embodiment of the invention, upon receiving the image of the identification tag, converting module 504 converts the received image to a scan code, using one or more image processing algorithms. It may be apparent to a person skilled in the art that there are various image processing algorithms that convert an image of an identification tag, such as a barcode, into a scan code. The extracted scan code from the image is processed by recognition module 506 to recognize the selected product from the products stored in the database. In an embodiment of the invention, recognition module 506 sends the scan code to the database wherein the scan code is checked against a master list of the products pre-stored in the database to identify the product selected by a customer, such as customer 102.

Thereafter, information module 404 retrieves the product detail(s) of the recognized product from the database. The retrieved product detail is further displayed on the customer's wireless computing device through displaying module 508. It will be apparent to a person skilled in the art that the product detail displayed helps the customer to gain insight about the selected product. In an embodiment of the invention, information module 404 also provides similar products along with the associated product details corresponding to his/her selection. In another embodiment of the invention, information module 404 may provide various other related promotion/advertisements to the customer. In various embodiments of the invention, the similar products and the targeted advertisements are displayed by displaying module 508 on wireless computing device 104. It may be apparent to any person skilled in the art that the similar products and the targeted advertisements may also be stored in the database of the shopping store. In various embodiments of the invention, displaying module 508 interacts with the display functionalities of wireless computing device 104 to display the product details, targeted advertisements, and the like.

Subsequently, once the customer decides to purchase the selected product, purchasing module 406 enables the customer to complete the purchase as described earlier in FIG. 4. In an embodiment of the invention, purchasing module 406 includes a check-out module 510 and a transceiving module 512. Once the customer decides to purchase the selected product, check-out module 510 creates a check list including the selected product. The check list includes the product details of the selected product to reconfirm the product to be purchased by the customer. On approving the check list containing the product detail of the selected product, transceiving module 512 further helps the customer to complete the purchase.

In an embodiment of the invention, transceiving module 512 interacts with a payment gateway server to authorize the payment for the selected product. To further elaborate, transceiving module 512 interacts with the server of the shopping store which in turn interacts with the payment gateway server to complete the financial transaction. It may be appreciated by a person skilled in the art that the payment gateway server may be a credit card server in which the customer is first required to provide his/her credit card information to authorize the purchase. For example, once the customer selects a laptop to purchase, check-out module 510 generates a check list comprising the product detail of the laptop along with the price. On approving the content of the check list, transceiving module 512 interacts with a payment gateway server to complete the transaction.

In another embodiment of the invention, transceiving module 512 may interact with a pre-paid tag, such as NFC tag, associated with wireless computing device 104. The NFC tag is charged in advance with a variable amount. Once the check list is approved, the customer is required to flash the NFC tag associated with wireless computing device 104 near an NFC reader (pre-paid tag reader) located in the shopping store. This in turn identifies the customer associated with the NFC tag-enabled wireless computing device, such as wireless computing device 104 and further deducts the payment of the product from the identified NFC tag. It may be appreciated by a person skilled in the art that the NFC tag readers may be positioned at various check-out points in the shopping store.

Once purchasing module 406 completes the transaction, generating module 514 generates a receipt confirming the completion of the purchase. In an embodiment of the invention, generating module 514 creates an electronic copy of the receipt, which in turn is displayed to the customer through displaying module 508 on wireless computing device 104. It may be apparent to a person skilled in the art that the generated receipt can further be saved in wireless computing device 104 locally or in the database. In another embodiment of the invention, generating module 514 prints a physical copy of the receipt through any printer enabled in the shopping store.

The generated receipt further contains check-out detail. In an embodiment of the invention, the check-out detail includes at least one of weight and an identification data of the purchased product(s). The weight printed in the receipt corresponds to the actual weight of the product(s) purchased. It may be appreciated by a person skilled in the art that the weight printed on the receipt is utilized to cross check the items purchased by the customer with the items that may be carried by the customer at a check-out point, such as an exit. This will facilitate security and prevent thefts at the shopping store.

In another embodiment of the invention, disabling module 516 disables the identification tag of the purchased product. On the completion of the purchase through purchasing module 406, disabling module 516 in coordination with the database of the shopping store disables the identification tag of the purchased product based on the identification data. The identification data generated on the receipt is also shared with the database of the shopping store, which in turn disables the corresponding identification tags. This has been further explained in detail in conjunction with FIG. 3. It may be evident to any person skilled in the art that such mechanism will enable the shopping store to keep track of their sold products and help in effectively managing at the shopping store.

In an embodiment of the invention, interaction module 518 assists the customer to interact with other customer(s), such as his/her friend(s), present in the shopping store. Further, the customer and his friends have to be registered with the shopping store. It may be apparent to any person skilled in the art, that the customer will interact with his/her friends present in the shopping store through his/her wireless computing device 104. Furthermore, the friends of the customer may be identified by using at least one of a social networking site, such as Orkut™ and Facebook™, and the like used by the customer. For example, the registered customer while shopping in the shopping store is facilitated by interaction module 518 to add his/her friends (other registered customers) identified through any of the social networking site used by the customer. Subsequently, interaction module 518 monitors the presence of the added friends of the customer in the shopping store. In case the friends of the customer are present in the shopping store, interaction module 518 facilitates the customer to interact with his friends through an interface such as a chat interface. It may be appreciated by a person skilled in the art that interaction module 518 detects the presence of the friends of the customer when the friends initiate system 106 in his wireless computing device 104 in the shopping store.

In another embodiment of the invention, location module 520 updates the location of the customer with respect to the shopping store and is subsequently relayed to all its connected friends present in the shopping store. In an embodiment of the invention, location module 520 updates the location of the customer and the other customers based on the last product selected, such as the aisle where the product is placed, and thereafter updates the present location of the customer to its connected friends. In another embodiment of the invention, location module 520 updates the location of the customer and the other customers based on a respective GPS-enabled wireless computing device 104. In yet another embodiment of the invention, location module 520 updates the location based on the connected access point through which the wireless computing device communicates with the database of the shopping store.

Also, in an embodiment of the invention, wish-list module 522 facilitates the customer to create a wish list of one or more products to be purchased prior to visiting the shopping store. In an exemplary embodiment of the invention, the customer prior to visiting the shopping store is facilitated to create a list of one or more products while browsing through the catalogue of the shopping store via a computing device, such as laptop, desktop, and the like or his/her wireless computing device 104. Furthermore, the customer is enabled by system 106 to create a profile. The created profile is used to store the customer related data, such as wish list and customer information. The created profile of the customer is maintained at the database of the shopping store. For example, a profile may be created in the shopping store database to facilitate the customer to store information such as product detail, customer product preference and the like. The customer is thus required to login his/her profile to browse the products available in the shopping store. The customer can thus login into the database of the shopping store using its authentication details, such as a username and a password. Thereafter, the customer has access to the information about the products available in the shopping store. In case, the customer wants to create a list of one or more products which he/she may consider buying, wish-list module 522 provides an interface to the customer to further add the one or more selected products from the database to its wish-list application to generate a wish list. The wish list can further be retrieved in the shopping store to aid the customer while performing the shopping activity. For example, while selecting one or more products in the shopping store, the customer can retrieve his/her saved wish list to cross check the selected one or more products. Hence, the wish list serves as a reminder for the customer to purchase the desired one or more products.

In various embodiment of the invention, system 106 is a software application that can be installed in any wireless computing device 104. In various embodiments of the invention, image receiving module 402, identification module 502, information module 404, displaying module 508, purchasing module 406, generating module 514, disabling module 516, interaction module 518, location module 520, and wish-list module 522 of system 106 may be implemented in the form of hardware, software, firmware, and/or combinations thereof.

The method, system and computer program product described above have a number of advantages. The invention as described above provides a cost efficient and a scalable medium to perform a shopping activity in a shopping store. The invention enables a customer to select a product available in the shopping store using his/her wireless computing device and subsequently purchase the selected product using the wireless computing device. This in turn helps the customer save considerable time required to purchase the product in the shopping store as compared with the existing point-of-sale systems (POS). Additionally, the customer is provided with at least some product detail of the selected product and any other similar product information to further enrich the customer's shopping experience in the shopping store. Moreover, the invention removes any additional maintenance cost applied to the POS system as the entire shopping activity is carried from the customer's wireless computing device. Subsequently, it also reduces the cost applied to operate and maintain one or more POS systems. The invention further provides an avenue for retailers to display targeted promotional/advertisement messages on the customer's wireless computing device. In addition to the above mentioned advantages, the system provides a platform for the customer to interact with other customers present in the shopping store, the customer and the other customers being registered with the shopping store, and furthermore locate them in the shopping store.

The system to perform a shopping activity through a wireless computing device, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for performing a shopping activity through a wireless computing device. The computer program product includes a computer usable medium having a set program instructions comprising a program code for performing a shopping activity through a wireless computing device. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A method for performing a shopping activity in a shopping store through a wireless computing device, the wireless computing device being equipped with an imaging device, the wireless computing device being used by a customer, the method comprising:
   a. receiving an image of at least one identification tag of at least one product, the at least one product being selected by the customer, the image being captured by the imaging device;
   b. retrieving at least one product detail of the at least one selected product from a database based on the corresponding at least one identification tag, the database comprising one or more product details of corresponding one or more products;
   c. updating the present location of the customer and the product detail of the last product selected by the customer, to one or more other customers in the shopping store, wherein the customer and the one or more other customers are registered with the shopping store; and
   d. facilitating the customer to purchase the at least one selected product based on the at least one product detail, the purchase being performed through the wireless computing device.

2. The method according to claim 1, wherein the at least one identification tag is at least one of a barcode and an image tag.

3. The method according to claim 1 further comprising identifying the at least one selected product based on the received image of the at least one identification tag.

4. The method according to claim 3, wherein identifying the at least one selected product comprises:
   a. converting the received image of the at least one identification tag into a scan code based one or more image processing algorithms; and b. sending the scan code to the database for recognizing the at least one selected product from the one or more product details pre-stored in the database.

5. The method according to claim 1, wherein facilitating the purchase of the at least one selected product comprises:
   a. creating a check list comprising the at least one selected product; and
   b. interacting with at least one of a payment gateway server and a pre-paid tag reader to complete the purchase of the at least one selected product in the check list.

6. The method according to claim 1 further comprising generating a receipt of the purchase and at least one check-out detail.

7. The method according to claim 6, wherein the at least one check-out detail is at least one of a total weight of the at least one purchased product and at least one identification data of the at least one purchased product.

8. The method according to claim 7 further comprising disabling the at least one identification tag of the at least one purchased product, wherein the at least one identification tag is disabled based on the at least one identification data corresponding to the at least one selected product.

9. The method according to claim 1 further comprising creating a wish-list of one or more products prior to visiting the shopping store.

10. The method according to claim 1 further comprising facilitating the customer to interact with one or more other customers registered with the shopping store, wherein the interaction is performed through the wireless computing device.

11. The method according to claim 1 further comprising displaying the at least one product detail to the customer, the at least one product detail being displayed on the wireless computing device.

12. A system for performing a shopping activity in a shopping store through a wireless computing device, the wireless computing device being equipped with an imaging device, the wireless computing device being used by a customer, the system comprising:
   a. an image receiving module configured for receiving an image of at least one identification tag of at least one product selected by the customer, the at least one identification tag being captured by the imaging device;
   b. an information module configured for retrieving at least one product detail of the at least one selected product from a database, the database includes one or more product details of corresponding one or more products, the at least one product detail being retrieved based on the at least one identification tag;
   c. a location module configured for updating the present location of the customer and the product detail of the last product selected by the customer, to one or more other customers in the shopping store, wherein the customer and the one or more other customers are registered with the shopping store; and
   d. a purchasing module configured for facilitating the customer to purchase the at least one selected product based on the at least one product detail, the purchase being performed through the wireless computing device.

13. The system according to claim 12 further comprising an identification module configured for identifying the at least one selected product based on the received image of the at least one identification tag.

14. The system according to claim 13, wherein the identification module comprises:
   a. a converting module configured for converting the received image of the at least one identification tag into a scan code using one or more image processing algorithms; and
   b. a recognition module configured for processing the scan code for recognizing the at least one selected product from the one or more product details pre-stored in the database.

15. The system according to claim 12, wherein the purchasing module comprises a. a check-out module configured for creating a check list comprising the at least one selected product; and b. a transceiving module configured for interacting with at least one of a payment gateway server and a pre-paid tag reader to complete the purchase of the at least one selected product in the check list.

16. The system according to claim 12 further comprising a generating module configured for generating a receipt of the purchase and at least one check-out detail.

17. The system according to claim 12 further comprising a disabling module configured for disabling the at least one identification tag of the at least one purchased product.

18. The system according to claim 12 further comprising a wish-list module configured for facilitating the customer to create a list of one or more products prior to visiting the shopping store.

19. The system according to claim 12 further comprising an interaction module configured for facilitating the customer to interact with one or more other customers registered with the shopping store, wherein the interaction is performed through the wireless computing device.

20. The system according to claim 12 further comprising a displaying module configured for displaying the at least one product detail to the customer, the at least one product detail being displayed on the wireless computing device.

21. A computer program product for use with a computer, the computer program product comprising a set of instructions stored in a non-transitory computer usable medium having a computer readable program code embodied therein for performing a shopping activity in a shopping store through a wireless computing device, the wireless computing device being used by a customer, the wireless computing device being equipped with an imaging device, the computer readable program code performing:
   a. receiving an image of at least one identification tag of at least one product, the at least one product being selected by the customer, the image being captured by the imaging device;
   b. retrieving at least one product detail of the at least one selected product from a database based on the corresponding at least one identification tag, the database includes one or more product details of corresponding one or more products;
   c. updating the present location of the customer and the product detail of the last product selected by the customer, to one or more other customers in the shopping store, wherein the customer and the one or more other customers are registered with the shopping store; and
   c. facilitating the customer to purchase the at least one selected product based on the at least one product detail, the purchase being performed through the wireless computing device.

22. The computer program product of claim 21 further performing identifying the at least one selected product based on the received image of the at least one identification tag.

23. The computer program product of claim 22, wherein identifying the at least one selected product comprises:

a. converting the received image of the at least one identification tag into a scan code based one or more image processing algorithms; and
b. sending the scan code to the database for recognizing the at least one selected product from the one or more product details pre-stored in the database.

24. The computer program product of 21, wherein facilitating the purchase of the at least one selected product comprises: a. creating a check list comprising the at least one selected product; and b. interacting with at least one of a payment gateway server and a pre-paid tag reader to complete the purchase of the at least one selected product in the check list.

25. The computer program product of claim 21 further performing generating a receipt of the purchase and at least one check-out detail.

26. The computer program product of claim 21 further performing disabling the at least one identification tag of the at least one purchased product.

27. The computer program product of claim 21 further performing creating a wish-list of one or more products prior to visiting the shopping store.

28. The computer program product of claim 21 further performing facilitating the customer to interact with one or more other customers registered with the shopping store, wherein the interaction is performed through the wireless computing device.

29. The computer program product of claim 21 further performing displaying the at least one product detail to the customer, the at least one product detail being displayed on the wireless computing device.

* * * * *